United States Patent
Campbell et al.

(10) Patent No.: US 9,047,190 B2
(45) Date of Patent: *Jun. 2, 2015

(54) INTRUSION PROTECTION FOR A CLIENT BLADE

(75) Inventors: Keith M. Campbell, Cary, NC (US); Raymond T. Greggs, Raleigh, NC (US); James G. McLean, Fuquay-Varina, NC (US); Caroline M. Metry, Cary, NC (US); Edward S. Suffern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 2361 days.

This patent is subject to a terminal disclaimer.

(21) Appl. No.: 11/733,354

(22) Filed: Apr. 10, 2007

(65) Prior Publication Data

US 2008/0256370 A1 Oct. 16, 2008

(51) Int. Cl.
*H04L 29/06* (2006.01)
*G06F 11/07* (2006.01)
*G06F 21/55* (2013.01)

(52) U.S. Cl.
CPC ........ *G06F 11/0793* (2013.01); *G06F 11/0709* (2013.01); *G06F 21/554* (2013.01)

(58) Field of Classification Search
CPC  G06F 11/0709; G06F 11/0793; G06F 21/554
USPC .......... 726/23, 36; 713/1, 100, 300, 310, 323, 713/324
See application file for complete search history.

(56) References Cited

U.S. PATENT DOCUMENTS

| | | | |
|---|---|---|---|
| 4,377,000 A | 3/1983 | Staab | |
| 4,823,256 A | 4/1989 | Bishop et al. | |
| 5,086,499 A | 2/1992 | Mutone | |
| 6,131,166 A | 10/2000 | Wong-Insley | |
| 6,594,775 B1 * | 7/2003 | Fair | 714/4 |
| 6,618,821 B1 | 9/2003 | Duncan et al. | |
| 6,728,807 B1 | 4/2004 | Laursen | |
| 6,748,559 B1 | 6/2004 | Pfister et al. | |
| 7,302,593 B2 * | 11/2007 | Rothman et al. | 713/300 |

(Continued)

FOREIGN PATENT DOCUMENTS

| | | |
|---|---|---|
| EP | 1489498 | 12/2004 |
| JP | 2005327233 A | 11/2005 |
| WO | WO 2006/095338 A | 9/2006 |

OTHER PUBLICATIONS

Rayner, et al.; Creating A Hosted Client Environment On IBM eserver BladCenter With Citrix MetaFrame And IBM eserver Management Tools; Hosted Client Solutions; Mar. 2005; San Jose, CA.

(Continued)

*Primary Examiner* — Chau Le
(74) *Attorney, Agent, or Firm* — Edward J. Lenart; James R. Nock; Kennedy Lenart Spraggins LLP

(57) ABSTRACT

Receiving, by a blade management module from a client blade, notification of a loss of communications between a remote desktop apparatus and the client blade; responsive to the notification, accepting, by the blade management module from the remote desktop apparatus, an instruction to alter a power setting of the client blade; and; responsive to the instruction, altering, by the blade management module, the power setting of the client blade.

18 Claims, 5 Drawing Sheets

(56) References Cited

U.S. PATENT DOCUMENTS

| | | | |
|---|---|---|---|
| 7,330,999 B2* | 2/2008 | Davies et al. | 714/9 |
| 7,574,620 B2* | 8/2009 | Hartung | 714/4 |
| 7,590,873 B2* | 9/2009 | Takahashi et al. | 713/300 |
| 7,644,302 B2* | 1/2010 | Kambara et al. | 714/6 |
| 2003/0105859 A1 | 6/2003 | Garnett et al. | |
| 2004/0015581 A1 | 1/2004 | Forbes | |
| 2004/0054780 A1 | 3/2004 | Romero | |
| 2004/0103180 A1 | 5/2004 | Brown et al. | |
| 2004/0109406 A1 | 6/2004 | Rothman et al. | |
| 2004/0158627 A1 | 8/2004 | Thornton | |
| 2004/0210887 A1 | 10/2004 | Bergen et al. | |
| 2004/0215617 A1* | 10/2004 | Ramsey et al. | 707/10 |
| 2004/0262409 A1 | 12/2004 | Crippen et al. | |
| 2005/0021654 A1 | 1/2005 | Kern et al. | |
| 2005/0028000 A1 | 2/2005 | Bulusu et al. | |
| 2005/0138473 A1 | 6/2005 | Mathew et al. | |
| 2005/0257213 A1 | 11/2005 | Chu et al. | |
| 2006/0002427 A1 | 1/2006 | MacInnis et al. | |
| 2006/0143612 A1 | 6/2006 | Cromer et al. | |
| 2006/0164421 A1 | 7/2006 | Cromer et al. | |
| 2006/0168486 A1 | 7/2006 | Cromer et al. | |
| 2006/0184349 A1 | 8/2006 | Goud et al. | |
| 2006/0190484 A1 | 8/2006 | Cromer et al. | |
| 2006/0203460 A1 | 9/2006 | Aviv | |
| 2006/0242400 A1 | 10/2006 | Anderson et al. | |

OTHER PUBLICATIONS

PCT Search Report, Aug. 22, 2008; PCT Application No. PCT/EP2008/054054.

Rist, et al., "Tools for the Desktop PC Revolution", InfoWorld, Oct. 20, 2003, Issue 41, 2 pages, InfoWorld Media Group Inc., San Francisco, CA.

UK Examination Report for Application 06701219.5-2416, Jan. 23, 2008, 5 pages, UK Patent Office, UK.

* cited by examiner

INTRUSION PROTECTION FOR A CLIENT BLADE

BACKGROUND OF THE INVENTION

1. Field of the Invention

The field of the invention is data processing, or, more specifically, methods, apparatus, and products for intrusion protection for a client blade.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which substantial technical advances have been achieved is in remote desktop environments that utilize client blades. A client blade is connected to an end user on a remote desktop apparatus using a network connection. Video and audio information is sent from the client blade to the remote desktop apparatus and the end user. Similarly, the keyboard and mouse input information is sent from the remote desktop apparatus to the client blade. If there is a loss of communications between the remote desktop apparatus and client blade, however, the end user does not know the reason for the loss. The loss may have occurred for many reasons including a security breach. In current art, after a loss of communications the end user has no way to disconnect the client blade from the network.

SUMMARY OF THE INVENTION

Methods, apparatus, and computer program products are described for intrusion protection for a client blade, including receiving, by the blade management module from the client blade, notification of a loss of communications between the remote desktop apparatus and the client blade; responsive to the notification, accepting, by the blade management module from the remote desktop apparatus, an instruction to alter a power setting of the client blade; and; responsive to the instruction, altering, by the blade management module, the power setting of the client blade. The client blade includes a client-side computer processor subsystem in a client-server architecture, with the client blade implemented in a blade form factor, powered by a power supply, and coupled for data communications through a data communications network to a remote desktop apparatus that provides a user interface. The client blade also includes a client blade microcontroller that provides an interface between a blade management module and client blade computer hardware. The client blade is installed in a blade center, and the blade center includes a blade management module that has power supply control capabilities. The blade center is coupled for data communications to the client blade and to the remote desktop apparatus.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
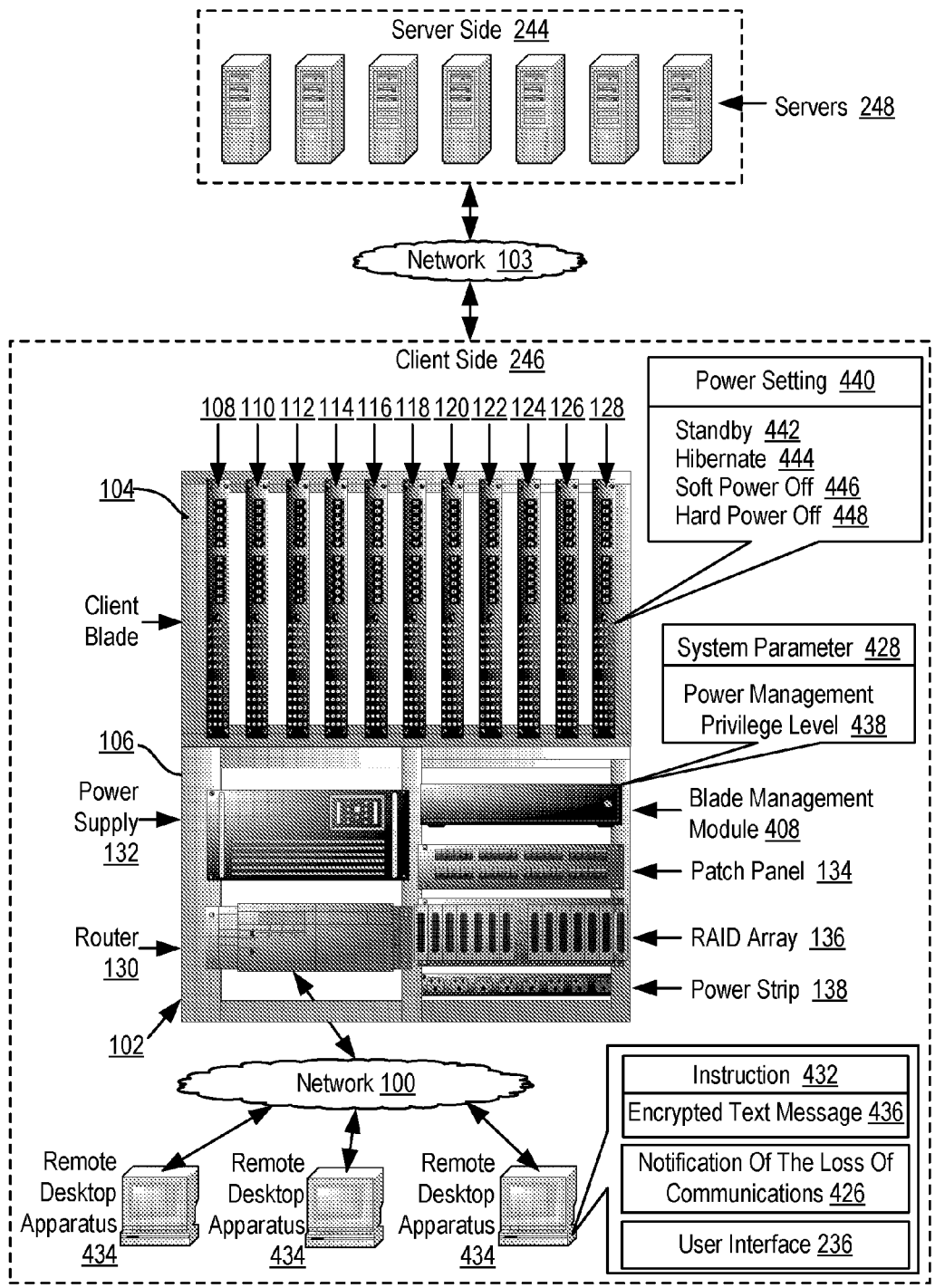
FIG. 1 sets forth a network diagram illustrating an exemplary system for intrusion protection for a client blade according to embodiments of the present invention.

Exemplary methods, systems, and products for intrusion protection for a client blade according to embodiments of the present invention are described with reference to the accompanying drawings, beginning with FIG. 1. FIG. 1 sets forth a network diagram illustrating an exemplary system for intrusion protection for a client blade according to embodiments of the present invention. A client blade is a computer that is entirely contained in a thin, modular circuit card placed in a centralized, secure location such as a blade center. A remote desktop apparatus connects the card to a user's display, keyboard, mouse and other peripheral devices. A client blade, in contrast to a thin client, is a complete computer that includes all the components normally found in a desktop personal computer ('PC') including a microprocessor, computer memory, a hard drive, a video adapter, and communications adapter. The client blade is similar in concept to a blade server, except that the ratio of cards to end-users is one-to-one rather than one-to-many, and, of course, the client blade runs client-side computer application programs.

The system of FIG. 1 includes eleven client blades (108-128) implemented in blade form factor and installed in a cabinet bay (104) of a blade center (102). The client blades (108-128) and all other components of the blade center (102) are powered by the power supply (132) that is installed in cabinet bay (106). Cabinet bay (106) contains a blade management module that has power supply control capabilities, a data communications network router (130), a patch panel (134), a Redundant Array of Independent Disks ('RAID') (136), and a power strip (138). The blade management module (408) is a hot-swappable device that can be used by a system administrator to configure and manage all components installed in the blade center (102). The blade management module provides system management functions for all components including power supply control abilities for the client blade. In the system of FIG. 1, the power supply (132) and the blade management module (408) are housed in cabinet bays for purposes of clarity. Those of skill in the art will recognize, however, that the power supply and blade management module may be implemented as part of the blade center (102) or external to the blade center.

In the system of FIG. 1, each client blade includes a client-side computer processor subsystem in a client-server architecture. Client-server architecture is a network architecture in which a client is separated from a server by a data communications network. Each instance of the client in a client-server architecture can send requests to the server. The term "client-side" as used here refers to operations that are performed by a client in a client-server relationship. A client is a computer system or software application that accesses a remote service on another computer system through a data communications network. A client may be, for example, a web browser, that runs on a user's local computer or workstation and connects to a server as necessary. A client may perform operations "client-side" because the operations require access to information or functionality that is available on the client but not on the server, because the user needs to observe them or provide input, or because the server lacks the processing power to perform the operations in a timely manner for all of the clients it serves. Additionally, if operations can be performed by the client, without sending data over the network, they may take less time, use less bandwidth, and incur a lesser security risk.

In the system of FIG. 1, the client-side (246) of the client-server architecture is represented as an aggregation of the blade center, including the client blades, and the remote desktop apparatuses (434). That is, a client in the client-server architecture of FIG. 1 is the combination of a remote desktop apparatus (434) and a client blade in a blade center, coupled for data communications through data communications network (100). The server-side (244) of the client-server architecture of FIG. 1 is represented by an aggregation of servers (248). The servers (248) may be application servers that host software applications, web servers that host websites, file transfer protocol (FTP) servers that host files, or any other type of server accessible by a client in the client-server architecture as will occur to those of skill in the art. The client-side (246) is coupled for data communications to the server-side (244) through the data communications network (103).

In the system of FIG. 1, the remote desktop apparatus (434) provides a user interface (236). A remote desktop apparatus (434) is automated computing machinery that provides a port through which a user may access a client blade. A remote desktop apparatus provides various inputs for peripheral devices such as a keyboard, mouse, or removable disk drive. The remote desktop apparatus also provides outputs for various devices such as a display device such as monitor and audio speakers. A user may access the computing power of a client blade through a remote desktop apparatus by using such input and output devices although all computing operations occur remotely in the client blade. The user interface provided by the remote desktop apparatus allows a user to access the remote client blade through a data communications network. Once the user has access to the client blade, the user manipulates the client blade through the operating system of the client blade by devices attached to the local remote desktop apparatus. To the user the remote nature of the client blade is transparent and the manipulation of the client blade occurs exactly as manipulation of a desktop PC.

Each client blade of FIG. 1 also includes a client blade microcontroller that provides an interface between a blade management module (408) and client blade computer hardware. Client blade computer hardware includes a microprocessor, computer memory, a hard disk drive, a video adapter and a communications adapter. The interface between the blade management module and the client blade computer hardware may be implemented as any communication link for out-of band communications of data and instructions. Examples of link types useful in such implementation include:

Peripheral Component Interconnect ('PCI') bus, a computer bus for attaching peripheral devices to a computer motherboard. PCI devices can be implemented as an integrated circuit fitted onto the motherboard itself, called a planar device in the PCI specification, or as an expansion card that fits into a socket.

$I^2C$ bus, a serial computer bus invented by Philips that is used to for low-speed communications with peripheral components of a system. The name stands for Inter-Integrated Circuit and is pronounced I-squared-C or sometimes as I-two-C.

PCI Express bus, a bus that allows expansion cards with various capabilities to be added to a system. While PCI Express has the same software interface as PCI and can be bridged to PCI, the cards are physically and electrically incompatible.

The Universal Serial Bus ('USB'), a serial bus standard for communications designed to allow a peripheral to be connected without an expansion cards, and to improve plug-and-play capabilities by allowing devices to be hot-swapped. Originally designed for computers, its flexibility has placed USB buses on video game consoles, PDAs, portable DVD and media players, cellphones, and even devices such as televisions, home stereo equipment, digital audio players, car stereos, and portable memory devices.

InfiniBand, a point-to-point, bidirectional serial link intended for the connection of processors with high speed peripherals such as storage devices. InfiniBand is the result of merging two competing designs, Future I/O, developed by Compaq, IBM, and Hewlett-Packard, and Next Generation I/O (ngio), developed by Intel, Microsoft, and Sun. From the Compaq side, the roots were derived from Tandem's ServerNet. For a short time before the group came up with a new name, InfiniBand was called System I/O.

Others as will occur to those of skill in the art.

Each remote desktop apparatus (434) of FIG. 1 is coupled for data communications to a client blade. The client blade includes a communication adapter that supports intrusion protection for a client blade according to embodiments of the present invention by detecting a loss of communications between the remote desktop apparatus (434) and the client blade. The loss of communications may occur for many reasons including a hardware failure in the remote desktop apparatus, a hardware failure in the client blade, a network failure, or a security breach. The communications adapter may detect a loss of communications through various error detection and error correction schemes such as, for example:

Repetition schemes, where data of a stream of data that is to be sent, is broken up into blocks of bits, and in sending, each block is sent a predetermined number of times.

Parity schemes, where a stream of data is broken up into blocks of bits, and the bits that are high, a digital "1," are counted, and a "parity bit" is set if the number of high bits is odd.

Polarity schemes, where a polarity reversed bitstream is simultaneously transmitted with the bitstream it is meant to correct;

Cyclic redundancy checks, where a block of data is used as the coefficients to a polynomial, divided by a fixed, predetermined polynomial, and the coefficients of the result of the division are used taken as the redundant data bits, the CRC. On reception of the block of data, the CRC is calculated from the block of data and compared with the CRC that was received. A mismatch indicates that an error occurred.

And other schemes as may occur to those of skill in the art.

Once the communication adapter of the client blade detects the loss of communications between the client blade and the remote desktop apparatus, the communication adapter notifies the client blade microcontroller of the loss of communications.

In the system of FIG. 1, the blade management module (408) then receives notification (426) of the loss of communications between the remote desktop apparatus (434) and the client blade from the client blade microcontroller of the client blade. The blade management module (408) receives such notification of a loss of communications through the out-of-band communications link from a client blade microcontroller contained in the client blade. The notification may be an implemented as an event that is logged in an event log so that the event may be later analyzed by a system administrator.

In the system of FIG. 1, the blade management module (408), in response to the notification (426), accepts an instruction (432) to alter a power setting (440) of the client blade. The blade management module will not entertain an instruction to alter the power setting of a client blade until the notification of a loss of communications between the remote desktop apparatus and the client blade is received. The instruction may be received through a data communications network, for example, by means of TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. The instruction (432) may include an encrypted text message (436) authenticating the identity of the remote desktop apparatus (434). The contents of the encrypted text message (436) identify the power setting to which the client blade is to be altered. The encrypted text message (436) may, for example, identify the standby power setting for the client blade.

In the system of FIG. 1, the blade management module (408), in response to the instruction (432) alters the power setting (440) of the client blade. The power setting (440) of the client blade may include any of the following:

a standby (442) power setting that leaves power applied to computer memory in the client blade, leaves power applied to the client blade microcontroller, and powers down other hardware components of the client blade;

a hibernate (444) power setting that saves to disk the contents of computer memory in the client blade, leaves power applied to the client blade microcontroller, and powers down other hardware components of the client blade including the computer memory in the client blade;

a soft power off (446) setting that terminates operation of all software on the client blade, leaves power applied to the client blade microcontroller, powers down other hardware components of the client blade including the computer memory in the client blade, and requires a reboot to restart software operations on the client blade; and a hard power off (428) setting that leaves power applied to the client blade microcontroller, removes external power from all other hardware components of the client blade, and requires a reboot to restart the client blade.

The blade management module may alter the power setting (440) of the client blade by sending, to the client blade microcontroller on the client blade, an instruction to alter the power setting (440) of the client blade. The instruction to alter the power setting may include an identification of the power setting to which the client blade is to be altered. If the identified power setting is a standby power setting, hibernate power setting, or soft power off setting the client blade microcontroller provides a power setting signal to a Super I/O chip located on the client blade (424) in accordance with the identified power setting. If the identified power setting is a hard power off setting, then the client blade microcontroller sends a command to the power supply (132) of the blade center (102) to effect a hard power of the client blade. A Super I/O chip is a controller integrated circuit that combines interfaces for a variety of low-bandwidth devices. The interfaces provided by the Super I/O chip usually include:

a floppy disk controller, a parallel port commonly used for printers, one or more serial ports, a mouse interface, a keyboard interface, and others as will occur to those of skill in the art.

By combining many interface functions in a single chip, the number of parts needed on a motherboard is reduced. Super I/O chips may communicate with the client blade microcontroller via a connection with an industry standard architecture ('ISA') bus or a Low Pin Count ('LPC') bus. Communication between the client blade microcontroller and the Super I/O chip through a LPC bus normally occurs through an LPC interface on the Southbridge chip of a motherboard. The Super I/O chip of the client blade interfaces with the advanced configuration and power interface ('ACPI') of the client blade. The ACPI specification is an open industry standard developed by HP™, Intel™, Microsoft™, Phoenix™, and Toshiba™ that defines common interfaces for hardware recognition, motherboard, device configuration, and power management. The ACPI standard allows the operating system to control power management. Conversely, the previously existing advanced power management ('APM') model assigns power management control to the BIOS, with limited intervention from the operating system. When utilizing the ACPI, the BIOS provides the operating system with methods for directly controlling the power management of the hardware so the operating system has nearly complete control over the power settings. The ACPI also enables power management features previously only available in portable computers to be utilized in desktop computers and servers, such as standby power settings and hibernate power settings. Through these power settings computer systems may be put into extremely low power-consumption states, that is, in states where only memory, or not even memory is powered, but from which ordinary interrupts (real time clock, keyboard, modem, etc.) can quickly wake the system.

The Super I/O chip of the client blade sends a command to the ACPI in accordance with the identification of the power setting to which the client blade is to be altered. If identified power setting is a standby power setting, for example, the Super I/O chip sends a command to the ACPI module to effect a standby power setting. The ACPI will operate to place the client blade in the standby state, leaving power applied to computer memory in the client blade, power applied to the client blade microcontroller, but powering down all other hardware components of the client blade.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Intrusion protection for a client blade in accordance with the present invention is generally implemented with computers, that is, with automated computing machinery. In the system of FIG. 1, for example, all the client blades, remote desktop apparatuses, and servers are implemented to some extent at least as computers. For further explanation, therefore, FIG. 2 sets forth a block diagram of automated computing machinery comprising an exemplary client blade (424) configured for intrusion protection for a client blade according to embodiments of the present invention. The client blade (424) of FIG. 2 includes at least one computer processor (156) or 'CPU' as well as random access memory (168) ('RAM') which is connected through a system bus (162) to processor (156) and to other components of the computer.

Figure 2:
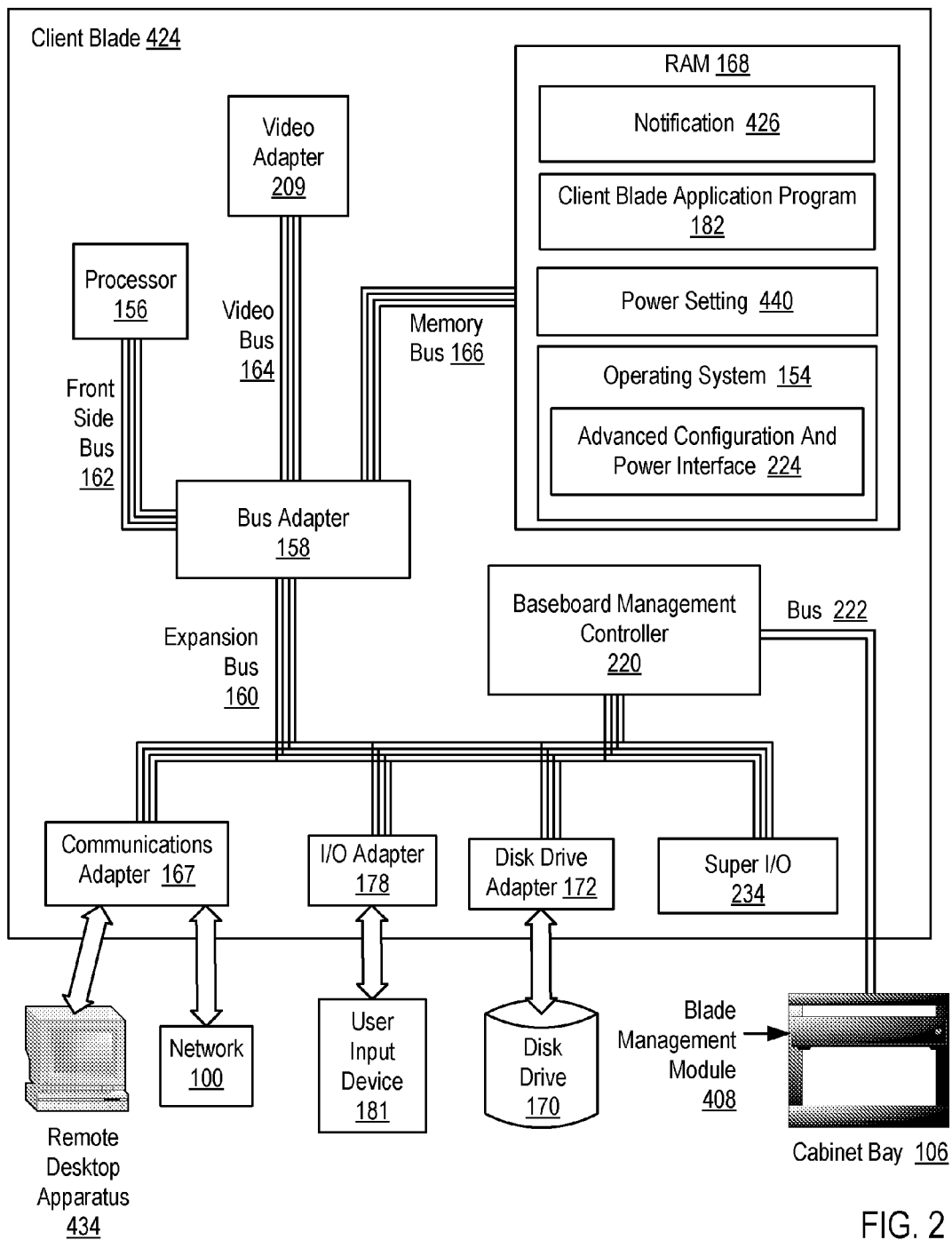
FIG. 2 sets forth a block diagram of automated computing machinery comprising an exemplary client blade configured for intrusion protection for a client blade according to embodiments of the present invention.

Stored in RAM (168) in the example of FIG. 2, is a client blade application program (182), a module of computer program instructions that causes the automated computing machinery in the example of FIG. 2 to alter the power setting (440) of the client blade (424) by detecting, by the communications adapter (416) of the client blade (424), a loss of communications between the remote desktop apparatus (434) and the client blade (424). The communications adapter (167) may detect a loss of communications through various schemes such as, for example, repetition schemes, parity schemes, polarity schemes, cyclic redundancy checks, hamming distance based checks, or through other ways as may occur to those of skill in the art. Once the communications adapter (167) detects the loss of communications between the client blade (424) and the remote desktop apparatus (434), the communications adapter (167) of the client blade (424) notifies the client blade microcontroller of the loss of communications between the remote desktop apparatus (434) and the client blade (424). An exemplary client blade microcontroller is depicted in FIG. 2 as the baseboard management controller (220).

The baseboard management controller (220) of the client blade (424) sends the notification (426) of the loss of communication between the remote desktop apparatus (434) and the client blade (424) to the blade management module (408). In the example client blade (424) of FIG. 2, the baseboard management controller (220) sends the notification (426) of the loss of communication to the blade management module (408) over bus (222). Bus (222) is an out-of-band communications of data and instructions between the baseboard management controller (220) and the blade management module (408). Types of communications links useful for such out-of-band communications include:

Peripheral Component Interconnect ('PCI') bus, a computer bus for attaching peripheral devices to a computer motherboard. PCI devices can be implemented as an integrated circuit fitted onto the motherboard itself, called a planar device in the PCI specification, or as an expansion card that fits into a socket.

$I^2C$ bus, a serial computer bus invented by Philips that is used to for low-speed communications with peripheral components of a system. The name stands for Inter-Integrated Circuit and is pronounced I-squared-C or sometimes as I-two-C.

PCI Express bus, a bus that allows expansion cards with various capabilities to be added to a system. While PCI Express has the same software interface as PCI and can be bridged to PCI, the cards are physically and electrically incompatible.

The Universal Serial Bus ('USB'), a serial bus standard for communications designed to allow a peripheral to be connected without an expansion cards, and to improve plug-and-play capabilities by allowing devices to be hot-swapped. Originally designed for computers, its flexibility has placed USB buses on video game consoles, PDAs, portable DVD and media players, cellphones, and even devices such as televisions, home stereo equipment, digital audio players, car stereos, and portable memory devices.

Infiniband link, a point-to-point, bidirectional serial link intended for the connection of processors with high speed peripherals such as storage devices. InfiniBand is the result of merging two competing designs, Future I/O, developed by Compaq, IBM, and Hewlett-Packard, with Next Generation I/O (ngio), developed by Intel, Microsoft, and Sun. From the Compaq side, the roots were derived from Tandem's ServerNet. For a short time before the group came up with a new name, InfiniBand was called System I/O.

Others as will occur to those of skill in the art.

The blade management module (408) of FIG. 2, is installed in cabinet bay (106) of a blade center, and operates generally to accept, in response to the notification (426), from the remote desktop apparatus (434), an instruction to alter a power setting (440) of the client blade (424). The blade management module (408) then alters, in response to the instruction, the power setting (440) of the client blade (424). The blade management module may alter the power setting of the client blade by sending, to the baseboard management controller (222) on the client blade (424), an instruction to alter the power setting (440) of the client blade. The instruction to alter the power setting includes an identification of the power setting to which the client blade is to be altered. If the identified power setting is a standby power setting, hibernate power setting, or soft power off setting the baseboard management controller provides a power setting signal to the Super I/O chip (234) located on the client blade (424) in accordance with the identified power setting. If the identified power setting is a hard power off setting then the client blade microcontroller sends a command to the power supply (132 on FIG. 1) of the blade center to effect a hard power of the client blade. The Super I/O chip (234) of the client blade (424) interfaces with the advanced configuration and power interface ('ACPI') (224) module stored in RAM (168) of the client blade (424). The Super I/O chip (234) of the client blade sends a command in accordance with the identification of the power setting to which the client blade is to be altered to the ACPI (224). If the identified power setting is a standby power setting, for example, the Super I/O chip (234) sends a command to the ACPI (224) to effect a standby power setting. The ACPI (224) then operates to place the client blade in the standby state, by leaving power applied to computer memory (168) in the client blade (424), power applied to the baseboard management controller (220), but powering down all other hardware components of the client blade.

Also stored in RAM (168) is an operating system (154) that includes the ACPI (224). Operating systems useful in computers according to embodiments of the present invention include UNIX™, Linux™, Microsoft XP™, Microsoft Vista™, AIX™, IBM's i5/OS™, and others as will occur to those of skill in the art. Operating system (154), client blade application program (182), notification (426), power setting (44), and ACPI (224) in the example of FIG. 2 are shown in RAM (168), but many components of such software typically are stored in non-volatile memory (166) also for example, on a disk drive (170).

The client blade (424) of FIG. 2 includes a bus adapter (158), a computer hardware component that contains drive electronics for the high speed buses, the front side bus (162), the video bus (164), and the memory bus (166), as well as drive electronics for the slower expansion bus (160). Examples of bus adapters useful in computers according to embodiments of the present invention include the Intel Northbridge, the Intel Memory Controller Hub, the Intel Southbridge, and the Intel I/O Controller Hub. Examples of expansion buses useful in computers according to embodiments of the present invention include Industry Standard Architecture ('ISA') buses and Peripheral Component Interconnect ('PCI') buses.

The client blade (424) of FIG. 2 includes disk drive adapter (172) coupled through expansion bus (160) and bus adapter (158) to processor (156) and other components of the client blade (424). Disk drive adapter (172) connects non-volatile data storage to the client blade (424) in the form of disk drive (170). Disk drive adapters useful in computers include Integrated Drive Electronics ('IDE') adapters, Small Computer System Interface ('SCSI') adapters, and others as will occur to those of skill in the art. In addition, non-volatile computer memory may be implemented for a computer as an optical disk drive, electrically erasable programmable read-only memory (so-called 'EEPROM' or 'Flash' memory), RAM drives, and so on, as will occur to those of skill in the art.

The example client blade (424) of FIG. 2 includes one or more input/output ('I/O') adapters (178). I/O adapters in computers implement user-oriented input/output through, for example, software drivers and computer hardware for controlling output to display devices such as computer display screens, as well as user input from user input devices (181) such as keyboards and mice. The example computer of FIG. 2 includes a video adapter (209), which is an example of an I/O adapter specially designed for graphic output to a display device such as a display screen or computer monitor, located at the remote desktop apparatus (434). Video adapter (209) is connected to processor (156) through a high speed video bus (164), bus adapter (158), and the front side bus (162), which is also a high speed bus.

The exemplary client blade (424) of FIG. 2 includes a communications adapter (167) for implementing data communications with a remote desktop apparatus (434). Such data communications may be carried out serially through RS-232 connections, through external buses such as USB, through data communications networks such as Ethernet Internet Protocol ('IP') networks, and in other ways as will occur to those of skill in the art. Communications adapters implement the hardware level of data communications through which one computer sends data communications to another computer, directly or through a network. Examples of communications adapters useful for intrusion protection for a client blade according to embodiments of the present invention include modems for wired dial-up communications, Ethernet (IEEE 802.3) adapters for wired network communications, and 802.11b adapters for wireless network communications.

Figure 3:
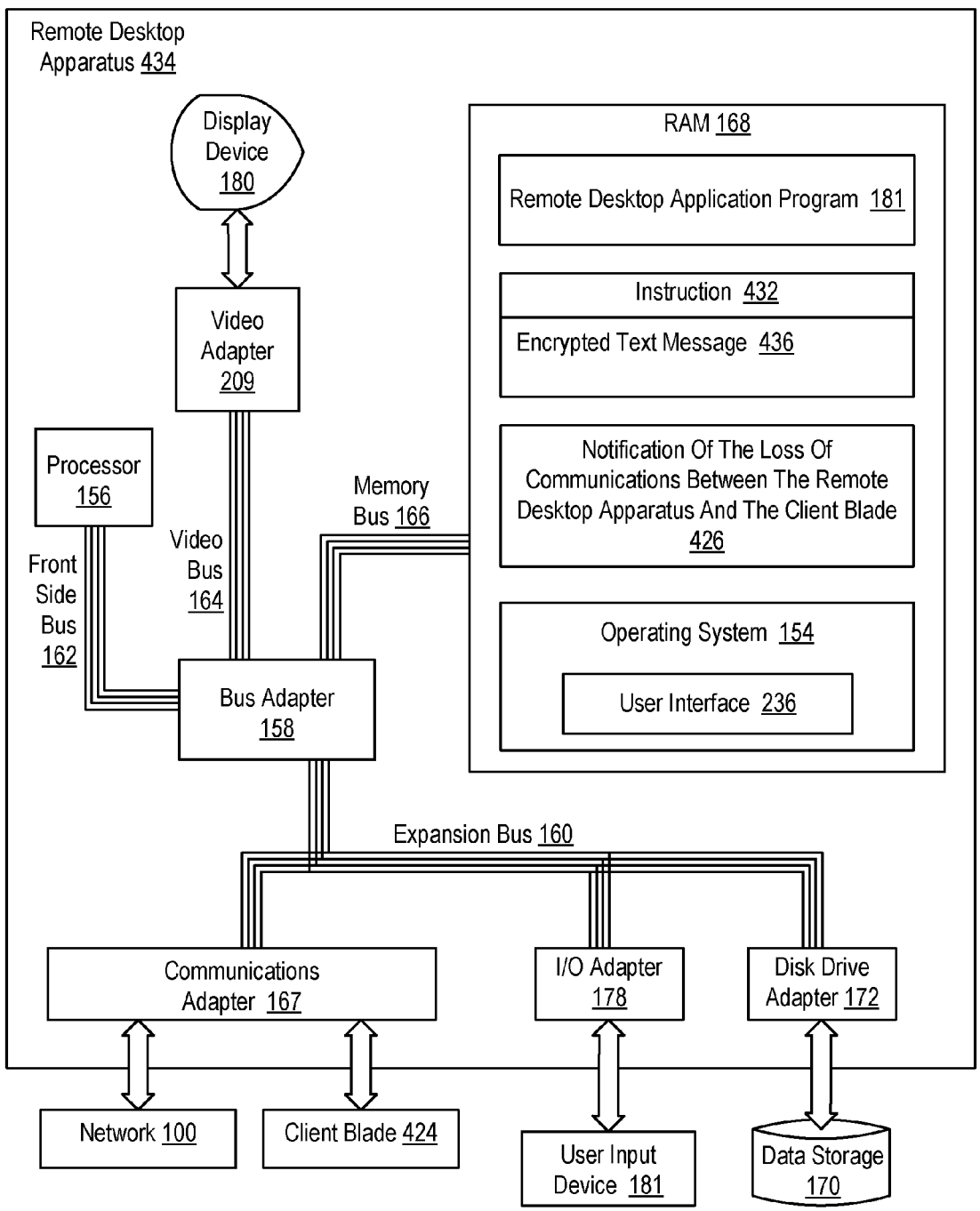
FIG. 3 sets forth a block diagram of automated computing machinery comprising an exemplary remote desktop apparatus configured for intrusion protection for a client blade in according to embodiments of the present invention.

For further explanation FIG. 3 sets forth a block diagram of automated computing machinery comprising an exemplary remote desktop apparatus (434) configured for intrusion protection for a client blade in according to embodiments of the present invention. The example remote desktop apparatus (434) of FIG. 3 includes several components that are structured and operate similarly as do parallel components of the client blade (424 on FIG. 1), having the same drawing reference numbers, as described above with reference to FIG. 3: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), and so on.

Stored in RAM in the example of FIG. 3 is a remote desktop application program (181), a module of computer program instructions that causes the remote desktop apparatus (434) in the example of FIG. 3 to send an instruction (432) to alter a power setting of the client blade (424) to the blade management module. The remote desktop apparatus (434) may send the instruction to the blade management module through data communications network (100), for example, by means of TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. The instruction (432) may include an encrypted text message (436) authenticating the identity of the remote desktop apparatus (434). The contents of the encrypted text message identify the power setting to which the client blade is to be altered. The encrypted text message may, for example, identify the hibernate power setting for the client blade.

Figure 4:
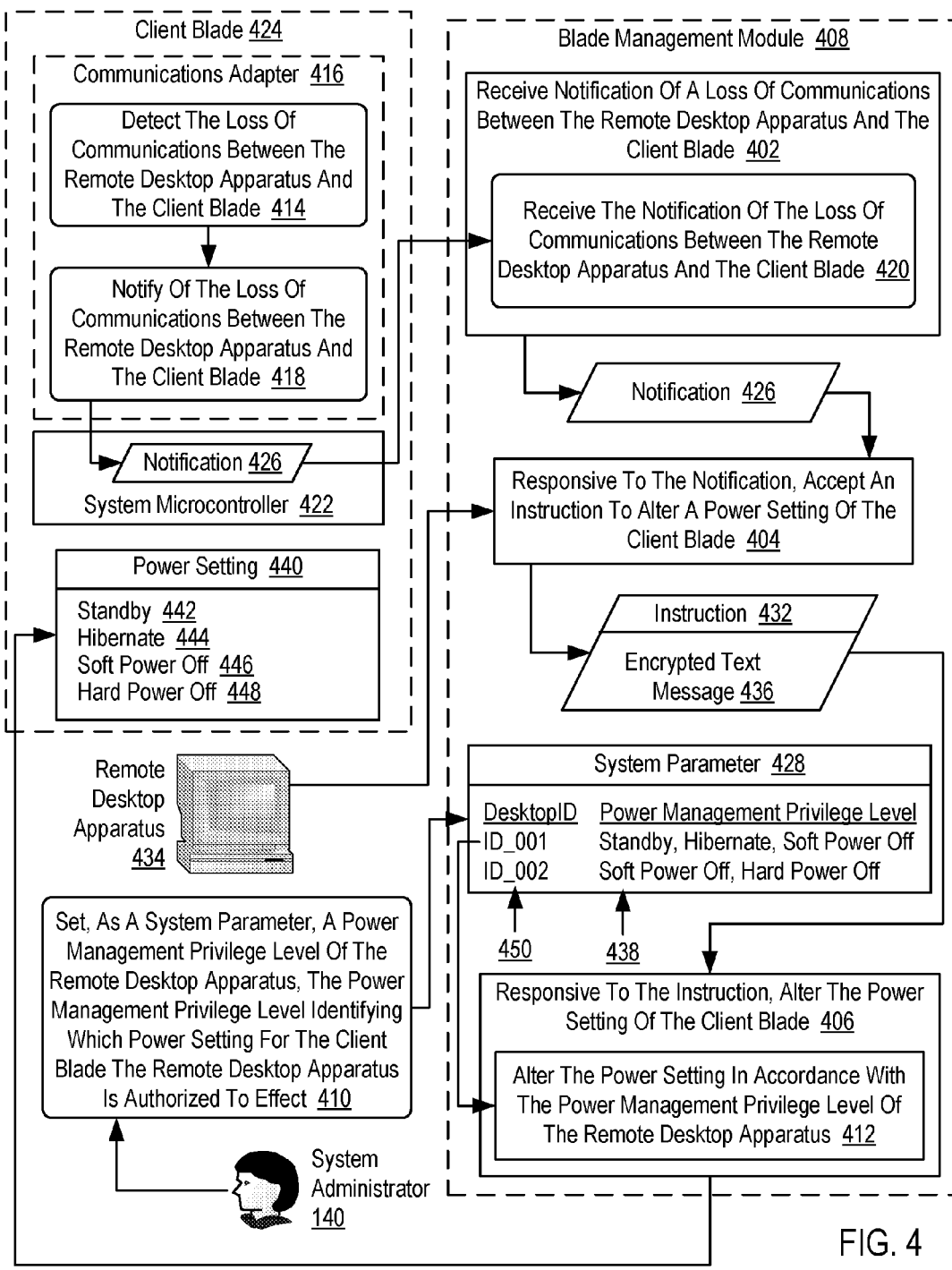
FIG. 4 sets forth a flow chart illustrating an exemplary method for intrusion protection for a client blade according to embodiments of the present invention.

For further explanation, FIG. 4 sets forth a flow chart illustrating an exemplary method for intrusion protection for a client blade (424) according to embodiments of the present invention. In the method of FIG. 4 the client blade (424) includes a client-side computer processor subsystem in a client-server architecture. In the method of FIG. 4, the client blade (424) may be implemented in a blade form factor and powered by a power supply. The client blade is also coupled for data communications through a data communications network to a remote desktop apparatus (434) that provides a user interface. The client blade also includes a client blade microcontroller (422) that provides an interface between a blade management module (408) and client blade computer hardware.

In the method of FIG. 4, the client blade (424) is installed in a blade center that includes the blade management module (408). The blade management module (408) is a hot-swap device that can be used by a system administrator (140) to configure and manage all components installed in the blade center. The blade management module provides system management functions for all components including power supply control abilities for the client blade (424).

The method of FIG. 4 includes detecting (414) by a communications adapter (416) of the client blade (424) the loss of communications between the remote desktop apparatus (434) and the client blade (424). The communications adapter (416) of the client blade (424) may detect a loss of communications through various communication error detection and error correction schemes such as, for example, repetition schemes, parity schemes, polarity schemes, cyclic redundancy checks, hamming distance based checks, or through other ways as may occur to those of skill in the art. Once the communication adapter (416) detects the loss of communications, the communication adapter (416) notifies (418) the client blade microcontroller (422) of the loss of communications between the remote desktop apparatus (434) and the client blade (424).

The method of FIG. 4 also includes receiving (402), by the blade management module (408) from the client blade (424), notification (426) of a loss of communications between the remote desktop apparatus (434) and the client blade (424). In the method of FIG. 4, receiving (402) notification of a loss of communications includes receiving (420), by the blade management module (408) from the client blade microcontroller (422) of the client blade (424), the notification (426) of the loss of communications between the remote desktop apparatus (434) and the client blade (424).

The method of FIG. 4 also includes accepting (404), by the blade management module (408) from the remote desktop apparatus (434), in response to the notification (426), an instruction (432) to alter a power setting (440) of the client blade (424). The blade management module (408) is configured such that no instruction to alter a power setting of the client blade is accepted until the blade management module (408) receives a notification of a loss of communication between the client blade and the remote desktop apparatus. In the method of FIG. 4, the instruction (432) to alter the power setting (440) of the client blade (424) includes an encrypted text message (436) authenticating the identity of the remote desktop apparatus (434). The text message may be encrypted through various encryption methods such as symmetric-key encryption, asymmetric-key encryption or other encryption methods as will occur to those of skill in the art.

The method of FIG. 4 also includes altering (406), in response to the instruction (432), by the blade management module (408), the power setting (440) of the client blade (424). In the method of FIG. 4, the power setting (440) of the client blade (424) includes a standby (442) power setting that leaves power applied to computer memory in the client blade (424), leaves power applied to the client blade microcontroller (422), and powers down other hardware components of the client blade. In the method of FIG. 4, the power setting (440) of the client blade (424) also includes a hibernate (444) power setting that saves to disk the contents of computer memory in the client blade (424), leaves power applied to the client blade microcontroller (422), and powers down other hardware components of the client blade including the computer memory in the client blade (424). In the method of FIG. 4, the power setting (440) of the client blade (424) also includes a soft power off (446) setting that terminates operation of all software on the client blade (424), leaves power applied to the client blade microcontroller (422), powers down other hardware components of the client blade (424) including the computer memory in the client blade (424), and requires a reboot to restart software operations on the client blade (424). And in the method of FIG. 4, the power setting (440) of the client blade (424) also includes a hard power off (448) setting that leaves power applied to the client blade microcontroller (422), removes external power from all other hardware components of the client blade (424), and requires a reboot to restart the client blade (424).

The method of FIG. 4 also includes setting (410), by a system administrator (140) as a system parameter (428), a power management privilege level (438) of the remote desktop apparatus (434). The power management privilege level (438) identifies which power setting (440) for the client blade (424) the remote desktop apparatus (434) is authorized to effect. In the method of FIG. 4, the system parameter (428) is a table that includes a column representing the identification of a remote desktop apparatus (450) and a column representing the power management privilege level (438) associated with that remote desktop apparatus. In this example, remote desktop apparatus identified as ID_001 has a power management privilege level that allows the remote desktop apparatus to effect either a standby, hibernate, or soft power off setting in the client blade. The remote desktop apparatus identified as ID_002 has a power management privilege level that allows the remote desktop apparatus to effect only a soft power off, or hard power off setting. Only two power management privilege levels are shown in FIG. 4 for clarity, not for limitation. One of ordinary skill in the art will understand that the system parameter (428) may include a power management privilege level for every remote desktop apparatus authorized to access the client blade (424).

In the method of FIG. 4, altering (406) the power setting (440) of the client blade (424) includes altering (412) the power setting (440) in accordance with the power management privilege level (438) of the remote desktop apparatus (434). The instruction (432) identifies the power setting (440) to which the client blade is to be altered. Consider as an example of altering the power setting, that the remote desktop apparatus identified (434) of FIG. 1 is identified as ID_001. The remote desktop apparatus (434) sends an instruction (432) to the blade management module to alter the power setting of the client blade that includes an identification of a standby power setting. The blade management module then compares the identified power setting to the power management privilege level for the remote desktop apparatus identified as ID_001. Because the remote desktop apparatus identified as ID_001 is authorized to effect the standby power setting in the client blade the blade management module alters the power setting of the client blade (424) to the standby power setting. If however, the remote desktop apparatus (434) sends an instruction (432) to alter the power setting that includes an identification of a hard power off setting, the blade management module will not alter the power setting of the client blade (424).

Figure 5:
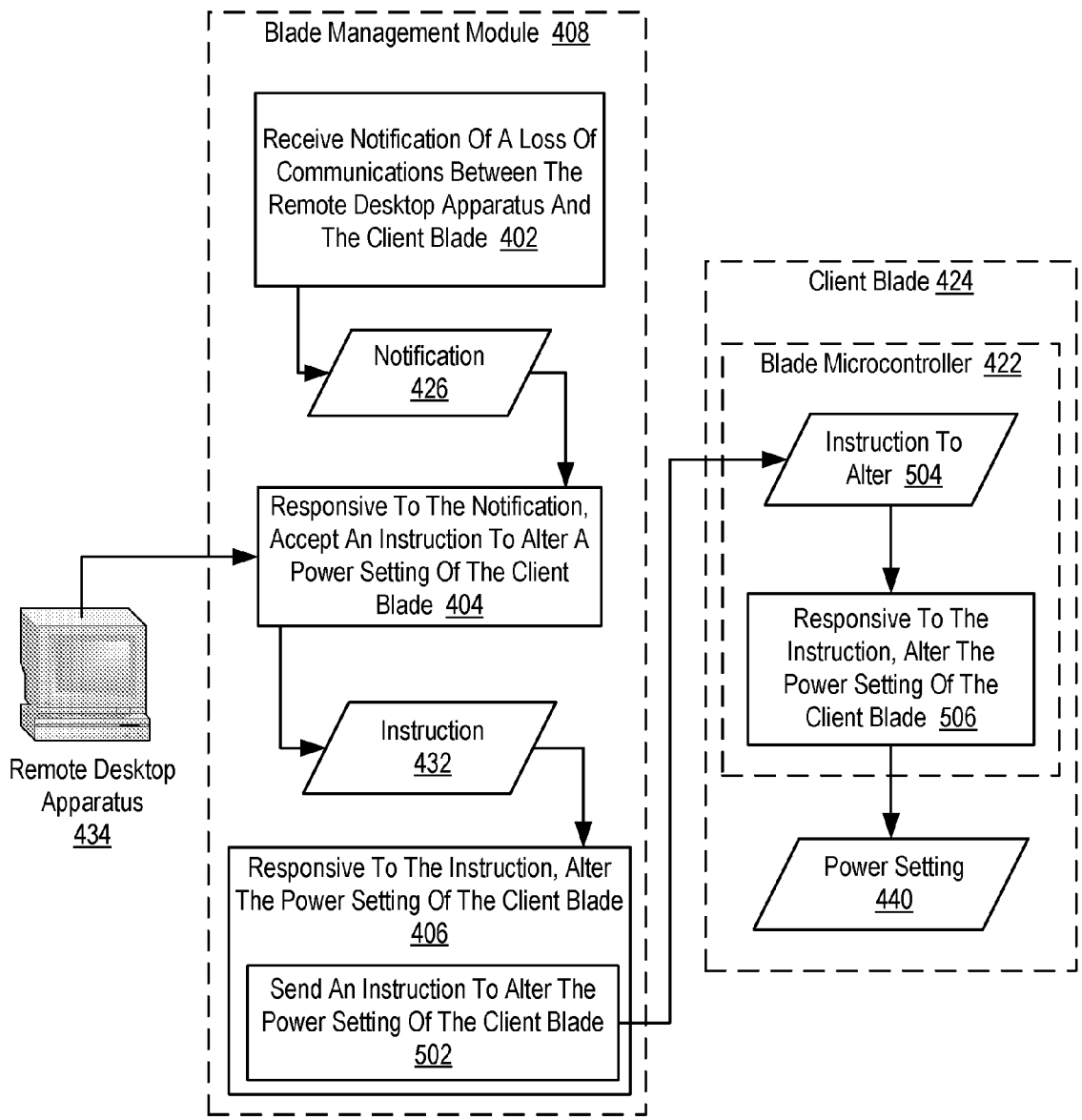
FIG. 5 sets forth a flow chart illustrating a further exemplary method for intrusion protection for a client blade according to embodiments of the present invention.

For further explanation, FIG. 5 sets forth a flow chart illustrating a further exemplary method for intrusion protection for a client blade according to embodiments of the present invention. The method of FIG. 5 is similar to the method of FIG. 4, including as it does the blade management module's (408) receiving (402) notification (426) of a loss of communications between the remote desktop apparatus (434) and the client blade (424), the blade management module's (408) accepting (404), from the remote desktop apparatus (434), an instruction (432) to alter a power setting (440) of the client blade (424), and the blade management module's (408) altering (406) the power setting (440) of the client blade (424) all of which operate in a similar manner as described above. In the method of FIG. 5, however, unlike the method of FIG. 4, altering (406) the power setting (440) of the client blade (424) is carried out by sending (502), by the blade management module (408) to the client blade microcontroller (422) on the client blade (424), an instruction (504) to alter the power setting (440) of the client blade (424). Once the client blade microcontroller receives the instruction (504) to alter the power setting the power setting (440) of the client blade (424) is altered (506), through the client blade microcontroller (422).

Exemplary embodiments of the present invention are described largely in the context of a fully functional computer system for intrusion protection for a client blade. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of intrusion protection for a client blade, the client blade comprising:
    a client-side computer processor subsystem in a client-server architecture, the client blade implemented in a blade form factor, powered by a power supply, and coupled for data communications through a data communications network to a remote desktop apparatus, the remote desktop apparatus providing a user interface, the client blade also comprising a client blade microcontroller that provides an interface between a blade management module and client blade computer hardware,
    the client blade installed in a blade center, the blade center comprising the blade management module having power supply control capabilities, the blade center coupled for data communications to the client blade and to the remote desktop apparatus,
    the method comprising:
    receiving, by the blade management module from the client blade, notification of a loss of communications between the remote desktop apparatus and the client blade;
    responsive to the notification, accepting, by the blade management module from the remote desktop apparatus, an instruction to alter a power setting of the client blade; and
    responsive to the instruction, altering, by the blade management module, the power setting of the client blade.

2. The method of claim 1 wherein the power setting of the client blade comprises:
    a standby power setting that leaves power applied to computer memory in the client blade, leaves power applied to the client blade microcontroller, and powers down other hardware components of the client blade;
    a hibernate power setting that saves to disk the contents of computer memory in the client blade, leaves power applied to the client blade microcontroller, and powers down other hardware components of the client blade including the computer memory in the client blade;
    a soft power off setting that terminates operation of all software on the client blade, leaves power applied to the client blade microcontroller, powers down other hardware components of the client blade including the computer memory in the client blade, and requires a reboot to restart software operations on the client blade; and
    a hard power off setting that leaves power applied to the client blade microcontroller, removes external power from all other hardware components of the client blade, and requires a reboot to restart the client blade.

3. The method of claim 1 further comprising:
    setting, by a system administrator as a system parameter, a power management privilege level of the remote desktop apparatus, the power management privilege level identifying which power setting for the client blade the remote desktop apparatus is authorized to effect;
    wherein altering the power setting of the client blade further comprises altering the power setting in accordance with the power management privilege level of the remote desktop apparatus.

4. The method of claim 1 further comprising:
    detecting by a communications adapter of the client blade the loss of communications between the remote desktop apparatus and the client blade; and
    notifying by the communication adapter the client blade microcontroller of the loss of communications between the remote desktop apparatus and the client blade;
    wherein receiving notification of a loss of communications further comprises receiving, by the blade management module from the client blade microcontroller of the client blade, the notification of the loss of communications between the remote desktop apparatus and the client blade.

5. The method of claim 1 wherein the instruction to alter the power setting of the client blade includes an encrypted text message authenticating the identity of the remote desktop apparatus.

6. The method of claim 1 wherein:
    altering the power setting of the client blade further comprises sending, by the blade management module to the client blade microcontroller on the client blade, an instruction to alter the power setting of the client blade; and
    the method further comprises, responsive to the instruction from the blade management module, altering, through the client blade microcontroller, the power setting of the client blade.

7. Apparatus for intrusion protection for a client blade, the client blade comprising:
    a client-side computer processor subsystem in a client-server architecture, the client blade implemented in a blade form factor, powered by a power supply, and coupled for data communications through a data communications network to a remote desktop apparatus, the remote desktop apparatus providing a user interface, the client blade also comprising a client blade microcontroller that provides an interface between a blade management module and client blade computer hardware,
    the client blade installed in a blade center, the blade center comprising the blade management module having power supply control capabilities, the blade center coupled for data communications to the client blade and to the remote desktop apparatus,
    the apparatus comprising a computer processor, a computer memory operatively coupled to the computer processor, the computer memory having disposed within it computer program instructions that, when executed by the computer processor, cause the apparatus to carry out the steps of:
    receiving, by the blade management module from the client blade, notification of a loss of communications between the remote desktop apparatus and the client blade;

responsive to the notification, accepting, by the blade management module from the remote desktop apparatus, an instruction to alter a power setting of the client blade; and responsive to the instruction, altering, by the blade management module, the power setting of the client blade.

8. The apparatus of claim 7 wherein the power setting of the client blade comprises:

a standby power setting that leaves power applied to computer memory in the client blade, leaves power applied to the client blade microcontroller, and powers down other hardware components of the client blade;

a hibernate power setting that saves to disk the contents of computer memory in the client blade, leaves power applied to the client blade microcontroller, and powers down other hardware components of the client blade including the computer memory in the client blade;

a soft power off setting that terminates operation of all software on the client blade, leaves power applied to the client blade microcontroller, powers down other hardware components of the client blade including the computer memory in the client blade, and requires a reboot to restart software operations on the client blade; and a hard power off setting that leaves power applied to the client blade microcontroller, removes external power from all other hardware components of the client blade, and requires a reboot to restart the client blade.

9. The apparatus of claim 7 further comprising:

computer program instructions capable of setting, by a system administrator as a system parameter, a power management privilege level of the remote desktop apparatus, the power management privilege level identifying which power setting for the client blade the remote desktop apparatus is authorized to effect;

wherein altering the power setting of the client blade further comprises altering the power setting in accordance with the power management privilege level of the remote desktop apparatus.

10. The apparatus of claim 7 further comprising:

computer program instructions capable of detecting by a communications adapter of the client blade the loss of communications between the remote desktop apparatus and the client blade; and computer program instructions capable of notifying by the communication adapter the client blade microcontroller of the loss of communications between the remote desktop apparatus and the client blade;

wherein receiving notification of a loss of communications further comprises receiving, by the blade management module from the client blade microcontroller of the client blade, the notification of the loss of communications between the remote desktop apparatus and the client blade.

11. The apparatus of claim 7 wherein the instruction to alter the power setting of the client blade includes an encrypted text message authenticating the identity of the remote desktop apparatus.

12. The apparatus of claim 7 wherein:

altering the power setting of the client blade further comprises sending, by the blade management module to the client blade microcontroller on the client blade, an instruction to alter the power setting of the client blade; and the apparatus further comprises computer program instructions capable of, responsive to the instruction from the blade management module, altering, through the client blade microcontroller, the power setting of the client blade.

13. A computer program product for intrusion protection for a client blade, the client blade comprising:

a client-side computer processor subsystem in a client-server architecture, the client blade implemented in a blade form factor, powered by a power supply, and coupled for data communications through a data communications network to a remote desktop apparatus, the remote desktop apparatus providing a user interface, the client blade also comprising a client blade microcontroller that provides an interface between a blade management module and client blade computer hardware, the client blade installed in a blade center, the blade center comprising the blade management module having power supply control capabilities, the blade center coupled for data communications to the client blade and to the remote desktop apparatus, the computer program product disposed upon a non-transitory computer readable medium, the computer program product comprising computer program instructions that, when executed, carry out the steps of:

receiving, by the blade management module from the client blade, notification of a loss of communications between the remote desktop apparatus and the client blade;

responsive to the notification, accepting, by the blade management module from the remote desktop apparatus, an instruction to alter a power setting of the client blade; and responsive to the instruction, altering, by the blade management module, the power setting of the client blade.

14. The computer program product of claim 13 wherein the power setting of the client blade comprises:

a standby power setting that leaves power applied to computer memory in the client blade, leaves power applied to the client blade microcontroller, and powers down other hardware components of the client blade;

a hibernate power setting that saves to disk the contents of computer memory in the client blade, leaves power applied to the client blade microcontroller, and powers down other hardware components of the client blade including the computer memory in the client blade;

a soft power off setting that terminates operation of all software on the client blade, leaves power applied to the client blade microcontroller, powers down other hardware components of the client blade including the computer memory in the client blade, and requires a reboot to restart software operations on the client blade; and a hard power off setting that leaves power applied to the client blade microcontroller, removes external power from all other hardware components of the client blade, and requires a reboot to restart the client blade.

15. The computer program product of claim 13 further comprising:

computer program instructions capable of setting, by a system administrator as a system parameter, a power management privilege level of the remote desktop apparatus, the power management privilege level identifying which power setting for the client blade the remote desktop apparatus is authorized to effect;

wherein altering the power setting of the client blade further comprises altering the power setting in accordance with the power management privilege level of the remote desktop apparatus.

16. The computer program product of claim 13 further comprising:
- computer program instructions capable of detecting by a communications adapter of the client blade the loss of communications between the remote desktop apparatus and the client blade; and
- computer program instructions capable of notifying by the communication adapter the client blade microcontroller of the loss of communications between the remote desktop apparatus and the client blade;
- wherein receiving notification of a loss of communications further comprises receiving, by the blade management module from the client blade microcontroller of the client blade, the notification of the loss of communications between the remote desktop apparatus and the client blade.

17. The computer program product of claim 13 wherein the instruction to alter the power setting of the client blade includes an encrypted text message authenticating the identity of the remote desktop apparatus.

18. The computer program product of claim 13 wherein:
- altering the power setting of the client blade further comprises sending, by the blade management module to the client blade microcontroller on the client blade, an instruction to alter the power setting of the client blade; and
- the computer program product further comprises computer program instructions capable of, responsive to the instruction from the blade management module, altering, through the client blade microcontroller, the power setting of the client blade.

* * * * *